United States Patent [19]
Sommer

[11] Patent Number: 4,815,239
[45] Date of Patent: Mar. 28, 1989

[54] APPARATUS FOR PRODUCTION OF INVOLUTE GEAR TOOTH FLANKS

[75] Inventor: Gerd R. Sommer, Dietikon, Switzerland

[73] Assignee: Werkzeugmaschinenfabrik Oerlikon-Bührle AG, Zurich, Switzerland

[21] Appl. No.: 2,224

[22] Filed: Jan. 12, 1987

Related U.S. Application Data

[62] Division of Ser. No. 792,210, Oct. 28, 1985.

[30] Foreign Application Priority Data

Nov. 3, 1984 [CH] Switzerland ................ 5520/84

[51] Int. Cl.⁴ .................... B24B 49/00; B24B 5/00
[52] U.S. Cl. ......................... 51/165.71; 51/52 R; 51/165.76; 51/165.77; 51/165.88
[58] Field of Search ............ 51/52 R, 95 GH, 52 HD, 51/105 GG, 123 G, 165.77, 165.71, 165.74, 165.76, 287, 165.87, 165.88

[56] References Cited

U.S. PATENT DOCUMENTS

| | | | |
|---|---|---|---|
| 3,916,569 | 11/1975 | Wydler | 51/52 R |
| 4,467,568 | 8/1984 | Block | 51/52 R |
| 4,555,871 | 12/1985 | Block | 51/52 R |
| 4,565,474 | 1/1986 | Charles | 51/52 R |

*Primary Examiner*—Robert P. Olszewski
*Attorney, Agent, or Firm*—Werner W. Kleeman

[57] ABSTRACT

An apparatus is disclosed in which only one working point or machining point on a machining tool, which in general can comprise a grinding wheel or disc, is in machining contact with a workpiece such as a gear blank during a machining operation. The position of this single working or machining point can be selectively chosen within a machining region of the grinding wheel or disk and can be prescribed to lie in a zone of fixed or variable radius of the grinding wheel or disk. This is achieved through at least one feed motion, in general a feed motion of the grinding wheel or disc, effected in addition to feed motions known per se in machining processes performed essentially according to the indexing generating method. This means that the machining contact point between the grinding wheel or disk and the gear blank does not wander on the grinding wheel or disk in correspondence with the generating feed motions but can be confined to a predeterminate region. It is nevertheless possible to displace this working or machining point in an orderly and programmed manner, i.e. under control, to optimally exploit the machining tool. In accordance with the method, the machining point can be guided along different types of machining lines, for example along lines which at least approximate tooth flank generatrices or along lines which at least approximate tooth traces or flank lines and which may be helical.

9 Claims, 14 Drawing Sheets

APPARATUS FOR PRODUCTION OF INVOLUTE GEAR TOOTH FLANKS

CROSS REFERENCE TO RELATED APPLICATION

This application is a divisional of our cognate patent application Ser. No. 06/792,210, filed on Oct. 28, 1985 and entitled: METHOD AND APPARATUS FOR PRODUCTION OF INVOLUTE GEAR TOOTH FLANKS.

BACKGROUND OF THE INVENTION

The present invention broadly relates to a method and apparatus for fabricating involute gear tooth flanks.

Generally speaking, the invention relates to a method for fabricating involute gear tooth flanks without or with geometric corrections by means of at least one machining tool and in which method machining, feed and traversing motions between the machining tool and a workpiece or gear blank are performed.

The invention is also concerned with a machine tool or machining apparatus for performing the method and comprising a machine frame with a generating carriage translatably seated on this machine frame. The machine tool or machining apparatus further comprises a workpiece or gear blank carrier or support and clamping means for holding a workpiece or gear blank and a multiple-carriage or carriage-and-slide arrangement for performing the machining, traversing and feed motions. Drive means as well as control means for carrying out, i.e. controlling and powering, these movements are also provided.

In a known method of fabricating involute gear tooth flanks, conical or dished grinding wheels are used which each respectively process a right and a left gear tooth flank. For this purpose, the two grinding wheels are fixed at an angle in relation to each other such that working or machining planes of the grinding wheels define the surfaces of a hypothetical generating rack on which the gear to be ground is generated or rolled. The inclination of the grinding wheels to a normal to the generating roll plane or pitch plane is generally the same as the pressure angle of the gear teeth. The relative motion between the machining tool or grinding wheel and the workpiece or gear blank for generating the involute form, the so-called generating roll motion, is derived from the pitch circle. FIG. 6 hereof shows the generating process of a gear wheel on a hypothetical rack in transverse section and in a number of phases. The points A, P, C, T and E' delimit segments of the line of action which correspond to regions of the tooth flank. The addendum flank or flank region is formed on the tooth flank during the grinding process when the section AC of the line of action is traversed. When the section CT of the line of action is traversed, then an initial or outer dedendum flank or flank region of the tooth flank involute is correspondingly formed.

The point T on the line of action is reached when the corner point K of the basic tooth rack profile lies on the line of centers OC connecting the workpiece or gear blank center 0 with the pitch point C on the line of action. The section TE of the line of action corresponds to two segments on the tooth flank which are formed simultaneously (cf. FIG. 11): a further or inner dedendum flank portion of the tooth flank involute and a trochoidal or undercut dedendum or root fillet radius. The point E is the lowest or innermost point of the involute and at the same time the initial point of the dedendum or root fillet trochoid or undercut. The curves or semicircles shown in dotted lines in FIG. 11 indicate which points of the inner dedendum flank portion of the tooth involute and of the dedendum fillet or undercut are simultaneously generated.

FIG. 16 shows the working or machining points Pi′, Pi″ on a dished or flat grinding wheel or disk which is in contact with the tooth flank of the workpiece or gear blank. During the grinding process, these working or machining points wander, depending upon the generating roll position i, along the machining or grinding surface of the disk and the edges of the grinding wheel and each such working or machining point lies on a generatrix of the tooth flank surface.

During the generating process, a working or machining point of a conical or beveled grinding wheel will wander along a meridian over a working or machining width of the grinding disk corresponding to the entire tooth flank. Machines or apparatus for such a process are, for example, described in the Swiss Pat. No. 592,604 granted Oct. 31, 1972, and the German Pat. No. 2,050,946, granted May 13, 1976. It is a disadvantage of this process that topological or geometric flank corrections can only be carried out to a relatively limited extent since due to the forces which arise between the workpiece or gear blank and the machining tool and other system conditions relative to the size of the gear tooth in general, a larger area of the grinding wheel or disk is involved in the machining process producing the involute form. The working or machining regions especially can only be very coarsely localized and can be influenced only by altering system features which are very difficult or impossible to carry out, such as grinding wheel size or shape.

SUMMARY OF THE INVENTION

Therefore, with the foregoing in mind, it is a primary object of the present invention to provide a new and improved apparatus for fabricating involute gear tooth flanks which do not exhibit the aforementioned drawbacks and shortcomings found in the prior art.

Another and more specific object of the present invention is to assure that the working or machining regions of the grinding wheels can, on the one hand, be kept small and that working or machining points of grinding wheel surfaces can, on the other hand, be predetermined in location for achieving more accurate tooth flank forms and more accurate and specific topographical or geometric corrections.

A further object of the invention is to provide machine tools or machining apparatus for performing the inventive method.

Now in order to implement these and still further objects of the invention, which will become more readily apparent as the description proceeds, the method of the present invention for fabricating involute gear tooth flanks is manifested by the features that working or machining contact between the workpiece or gear blank and the machining tool or grinding wheel is confined to a selectable working or machining point or to within the immediate vicinity thereof. The feed motion is performed such that the working or machining point is guided essentially along a selectably predeterminate working or machining line which lies at least approximately on the tooth flank surface for generating a generatrix envelope.

The apparatus of the present invention for fabricating involute gear tooth flanks is manifested by the features that it comprises guiding means and control means for controlling and guiding a selectable work or machining point on the machining tool along a selectably predeterminate working or machining line essentially extending along the tooth flank surface. For this purpose, the guiding means are connected with position determination means which transmit positioning signals to the control means for controlling the driving means.

An advantageous step of the inventive method consists in that the variably selectable working or machining point of the tool or grinding wheel, or at least a region in the immediate vicinity of this machining point, is confined during the machining operation by a supplementary feed motion of the tool to a working or machining region of the machining tool which is prescribable or predeterminate independently of the generating process.

A further advantageous step of the method consists in that the selectable working or machining point of the machining tool, or at least a region in the immediately vicinity of the machining point, is confined during the machining operation conjointly by a supplementary feed motion of the machining tool and a supplementary feed motion of the workpiece or gear blank toward the machining tool to a working or machining region of the machining tool which is prescribable or predeterminate independently of the generating process.

The supplementary feed motion of the machining tool can be performed along a symmetry plane or surface of tooth-space.

The supplementary feed motion of the workpiece or gear blank towards the machining tool can also be performed as a translatory motion, a rotary motion or a pure generating feed motion.

According to a further advantageous method step, the selectable working or machining point of the machining tool, or at least of a region in the immediate vicinity of the machining point, is continuously and prescribably or predeterminately displaced within the working or machining region during the machining operation by means of a work or machining point feed motion conforming to the wear of the machining tool.

The supplementary feed motions can be coupled with conventional or basic feed motions performed along the working or machining line for generating involute gear tooth flanks according to their generatrix envelopes.

For this purpose, the prescribable or predeterminate, i.e. selectably predeterminate, working or machining line may comprise segments which at least approximate generatrices of the tooth flank surface.

The prescribable or predeterminate, i.e. selectably predeterminate, working or machining line can also be composed of segments in which a first branch at least approximates a generatrix and a second branch at least approximates a profile line.

Furthermore, it is also possible to couple the supplementary feed motions with the conventional or basic feed motions along the working or machining line for producing involute gear tooth flanks according to their flank generatrix or tooth trace envelopes.

The prescribable or predeterminate working or machining line can be composed of segments which at least approximate tooth traces or flank lines of the tooth flank surfaces.

Alternatively, the prescribable or predeterminate working line can be composed of sections or segments in which a first branch is at least one tooth trace or flank line and a second branch or segment at least approximates a profile line.

The supplementary feed motion can be performed tangentially to the tooth flank or tangentially to a tooth flank meridian.

A further possibility is that the control of the working or machining point relative to the machining tool or grinding wheel surface can be performed in dependence of wear measurements on this machining tool surface.

The control of the motion of the work or machining point for achieving a better exploitation of the machining tool can also be performed in dependence of wear measurements and empirical values.

Furthermore, it is advantageous if the motion of the work or machining point is continuously or discontinuously superimposed on the supplementary feed motion.

In this inventive method, traversing motion for generating uncorrected tooth flanks can be performed in at least one stage, i.e. in one or more stages.

In the generation of topographically or geometrically corrected tooth flanks, the traversing motion on the selectably prescribable working or machining line can be performed in at least one stage. The traversing motions of possible further stages corresponding to the correction values for each correction point are performed continuously.

The traversing motions can be performed either by the machining tool or by the workpiece or gear blank and, here again, can be purely translatory, purely rotary or a combination of both types of motion.

All motions can be controlled by prescribable or predeterminate data or functions of data.

However, it is also possible for all motions, except generating feed motions known per se, to be controlled by prescribable or predeterminate data or functions of data.

The supplementary feed motion can also be controlled such that, given variable and continuously measured values for the generating path of the workpiece or gear blank center and for the longitudinal feed of the machining tool or grinding wheel relative to a reference point on the hypothetical reference or basic generating rack tooth flank tangent surface, the distance of the common working or machining point of the machining tool and of the workpiece or gear blank from a reference point, for example from the reference point on the reference or basic generating rack tooth flank, at least approximately satisfies the equation:

$$ys = h \cdot \tan \gamma + (w \cdot \sin \alpha t)/\cos \gamma \qquad (1)$$

The means of guidance of the apparatus for carrying out the method can comprise at least one slide or carriage providing at least one supplementary degree of adjustment freedom for the motion of the machining tool or tools.

One slide or carriage can also be provided for each machining tool as a guide means so that the machining tool or tools and their associated working or machining point are, in addition to all other motions, also displaceable tangentially to the tooth flank surface.

At least one slide or carriage can be provided as a guide means for a feed motion of the machining tool radial to the workpiece or gear blank. It is also possible to provide a slide or carriage for a feed motion tangential to the gear tooth flank.

Furthermore, the control means for controlling the generating feed motion can be mechanical means of control known per se, while the control means for controlling all other motions, or for that matter all of the motions, can be electronic circuitry means.

It is especially advantageous for the electronic circuitry means to comprise a master computer or control processor connected to:

a master control interface for signal input and output;

a grinding wheel control means for regulatably controlling at least one grinding wheel drive means;

a carriage control means for conjointly controlling appropriate drive means for standard pressure angle, tooth helix angle and motion of the intermediate slide or carriage to adjust or regulate the pressure angle adjustment;

an adjustment means for adjusting the tooth helix angle and at least one intermediate slide or carriage;

supplementary feed control means for controlling at least one drive means for at least one supplementary feed motion of each machining tool, for example either by means of a slide or carriage or as a resultant of a number of conjoint feed motions;

a traversing control means for controlling at least one drive means for normal traversing motions, topographical or geometrical correction traversing motions or both; and a measuring control means for operating a grinding wheel measuring or monitoring means and also connected to the control means for controlling the other motions.

The machining tool can comprise a dished grinding wheel or disk of a type known per se, a conical or beveled grinding wheel or disk of a type known per se or a dished grinding wheel or disk whose working or machining surface is a frustum of a cone with an included or cone angle slightly less than 180°.

An important advantage of the inventive method consists in that, even in comparison to the topographical or geometric correction relationships, larger and therefore more stable grinding wheels or disks or also other types of machining tools, for instance milling cutters, can be employed. This also entails other economical and technological advantages. In particular, in comparison to known methods, only a relatively small zone of the grinding wheel or disk need be sensed for wear monitoring and measurement. The controllable displacement of the active grinding zone entails, among other things, the additional advantage of an improved self-sharpening effect and therefore a considerably better exploitation of the grinding wheel or disk. The working or fillet radius can therefore also be controllably and considerably improved and machined.

The adjustability of the grinding wheel or disk is also improved due to the improved controllability of the active machining zone or region of the grinding wheel or disk as a result of its working or machining region being reduced in size and of the controllable displacement of the working or machining point. The topographical or geometric corrections can also be carried out considerably more accurately and with better distribution by means of such a controllable and practically definable working or machining point. The end or final values as well as control values for geometric correction are more easily mastered and better realisable, or are only thus possible. Difficult running properties of gears can be mastered and corrected considerably more specifically and therefore better than hitherto. The accuracy of fabrication is better and therefore better suited to specific conditions. There thus results a considerable improvement in the quality of the finished gears.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Describing now the drawings, it is to be understood that to simplify the showing thereof only enough of the apparatus for fabricating involute gear tooth flanks has been illustrated therein as is needed to enable one skilled in the art to readily understand the underlying principles and concepts of this invention. In one exemplary embodiment of the inventive fabricating method for involute gear tooth flanks, the workpiece or gear blank is in general horizontally or vertically clamped on a workpiece or gear table or rotary table equipped for performing the requisite generating feed motions. The tooth flank is subjected to a generating roll motion in relation to a machining surface of at least one grinding wheel or disk and which machining surface corresponds to the tooth flank of the reference or basic generating rack profile. The grinding wheel or disk simultaneously performs a rotary slide or carriage motion and a feed motion essentially along a generatrix of the tooth flank as a working or machining line. A traversing motion in the direction towards the tooth flank (i.e. a feed motion) determines the depth of cut. The workpiece or gear blank performs the generating feed motion (generatrix envelope).

Figure 7:
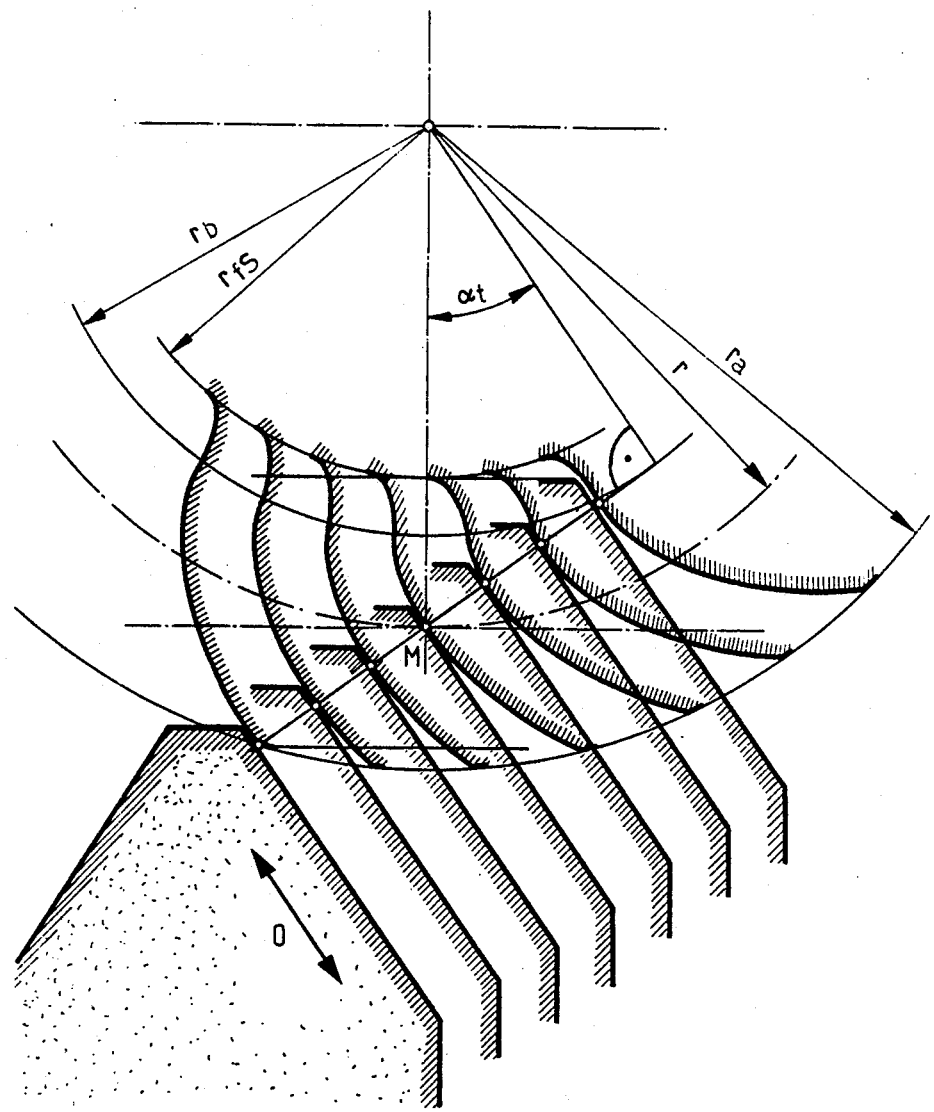
FIG. 7 shows the gear generating relationships between the gear tooth flank and the machining tool surface in various generating position according to the invention.

In addition to these feed motions, a supplementary feed motion is performed which is tangential to the tooth flank, preferably tangential as seen in transverse section (cf. FIG. 7). This supplementary feed motion is a relative motion between the workpiece or gear blank and the machining tool or grinding wheel or wheels. The grinding wheel or disk is thus entrained together with its momentary or active and variably selectable working or machining point in the direction of the gear tooth flank and the prescribable or predeterminate and selectable working or machining point moves on the tooth flank along a generatrix as a selectable or selectably predeterminate working or machining line, also known as the operative line. The working or machining point on the grinding wheel or disk remains (except for its rotation) at one point and does not wander, as is the case with prior art methods, over the entire working or machining width of the grinding wheel or disk in correspondence to the generating motions of the tooth flank on it. The working or machining point on the grinding wheel or disk is thus prescribable or predeterminate and selectable.

Furthermore, it is held in a prescribable working or machining region of the grinding zone independently of the grinding process. Consequently, this working or machining region can also be of smaller dimension or extent than in prior art methods. This is especially advantageous with coated tools, since the coating can then be applied to a smaller area. In particular, the supplementary feed motion can be controlled or governed in accordance with the formula or equation (FIG. 5):

$$ys = h \cdot \tan \gamma + (w \cdot \sin \alpha t)/\cos \gamma \quad (1)$$

wherein:
 $ys$ = distance of the working or machining point S from a contact point M on the gear tooth flank;
 $w$ = generating path length; continuously
 $h$ = grinding stroke length; monitored
 $\alpha t$ = pressure angle in transverse section; and
 $\gamma$ = angle between generatrix and pitch line of the generated tooth flank.

Figure 1:
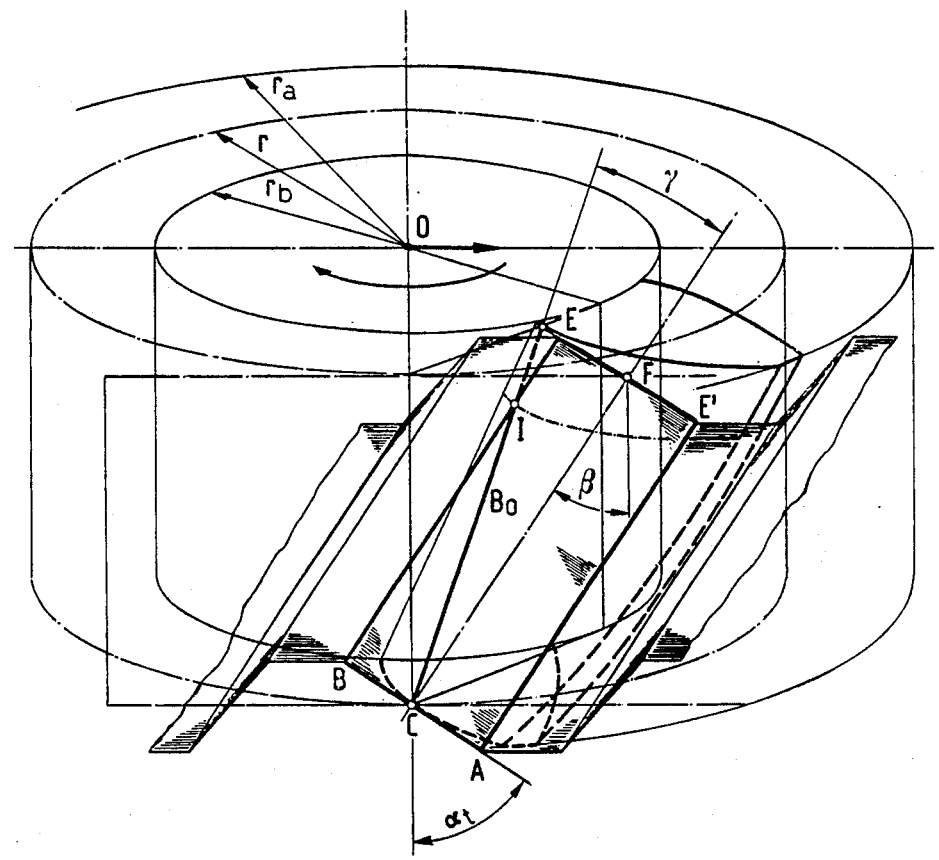
FIG. 1 shows the geometric relationships between a helical spur gear and the associated reference or basic generating rack tooth flank in a first generating position.
Figure 2:
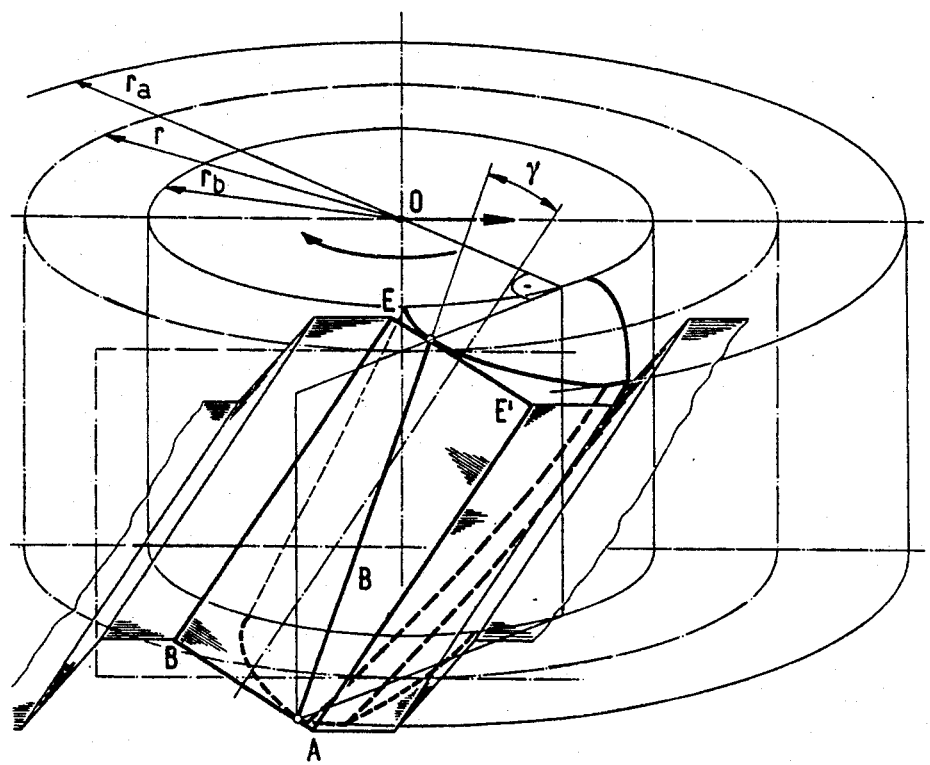
FIG. 2 shows the geometric relationship between a helical spur gear and the associated reference or basic generating rack tooth flank in a second generating position.
Figure 3:
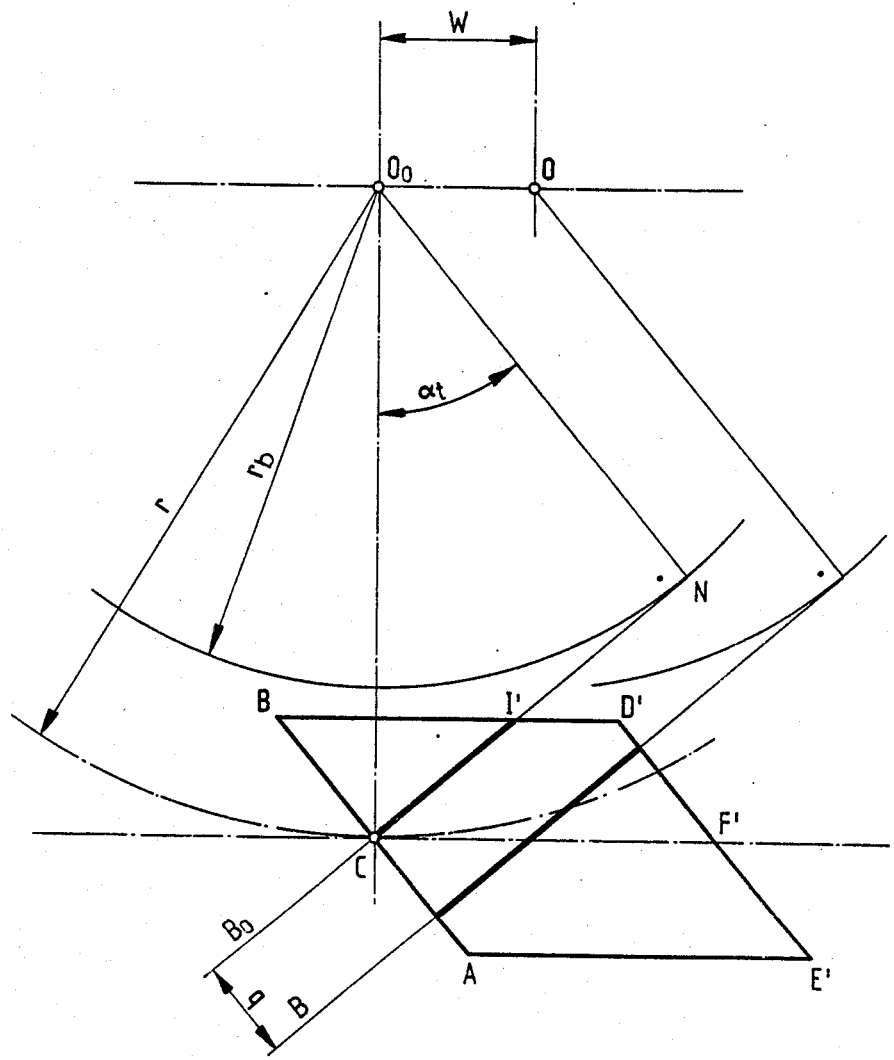
FIG. 3 shows the projection of the reference or basic generating rack tooth flank on the transverse section plane in two generating positions, including the geometrical relationships of significant variables.
Figure 4:
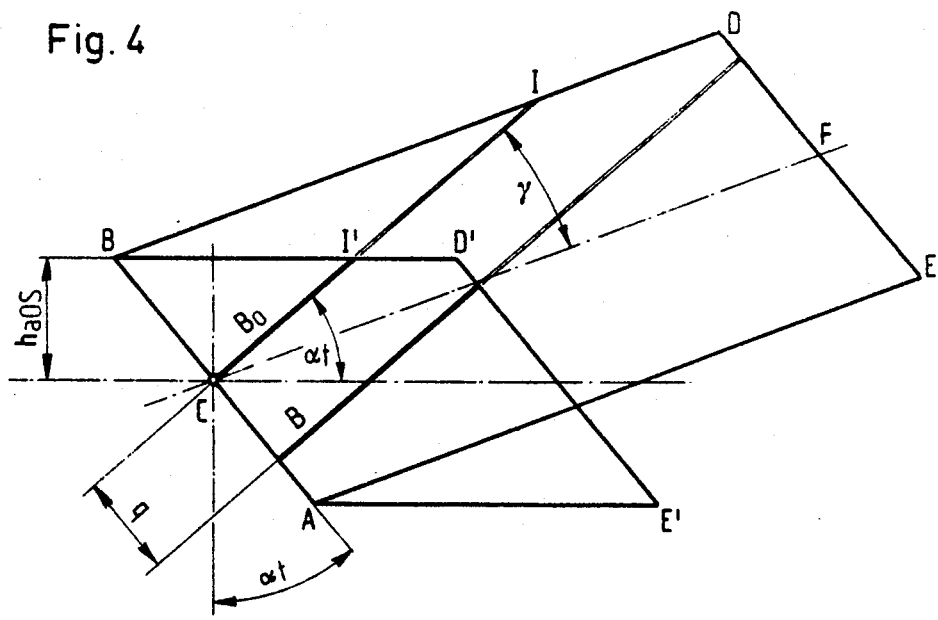
FIG. 4 shows the projection of the reference or basic generating rack tooth flank on the transverse section plane and, superimposed thereupon, a rotation of the reference or basic generating rack tooth flank into this transverse section plane, including the geometrical relationships of significant variables.
Figure 5:
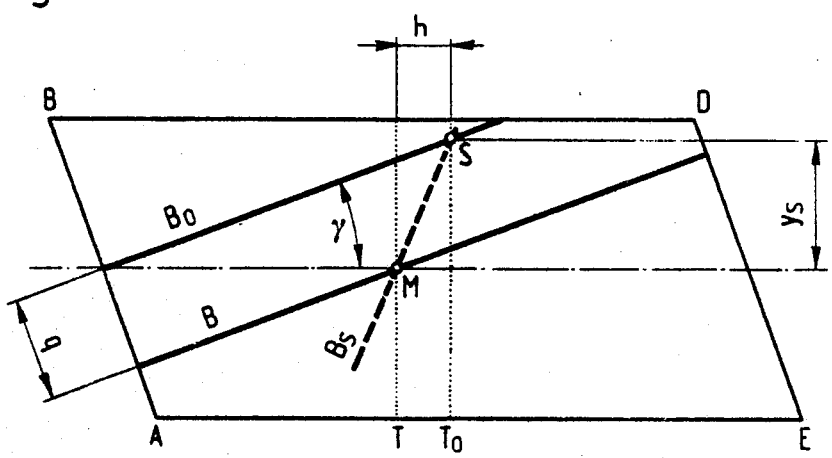
FIG. 5 shows a projection of the reference or basic generating rack tooth flank according to FIG. 4, including significant geometrical variables and relationships for two generating positions.
Figure 6:
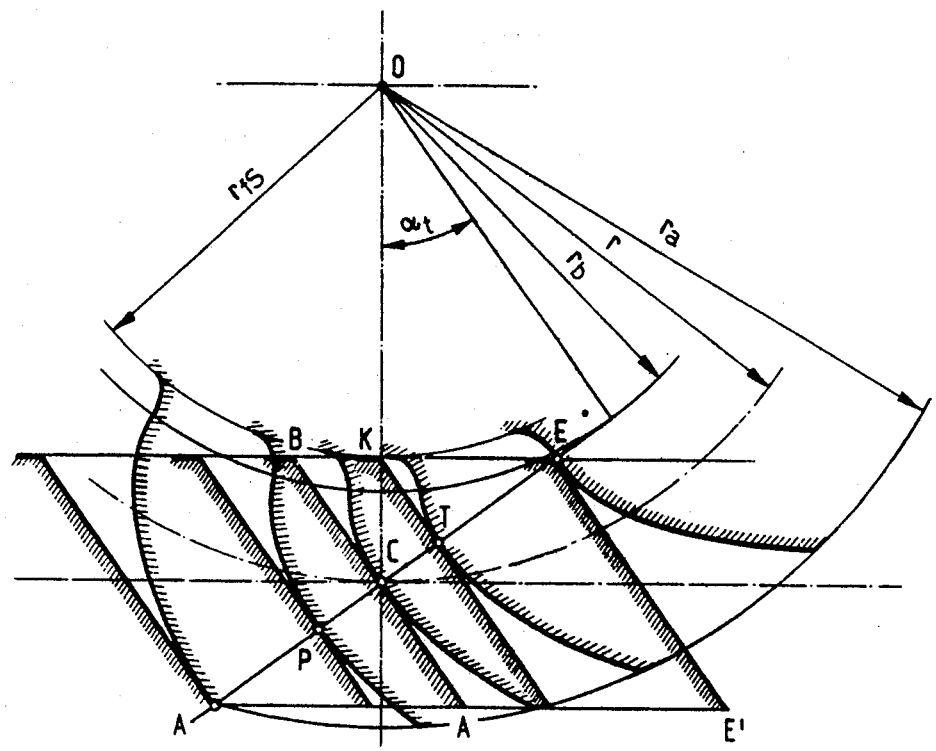
FIG. 6 shows the gear generating relationships between the gear tooth flank and the machining tool surface in various generating positions according to the state of the art.

Turning now specifically to FIG. 5 of the drawings, a helical spur gear is seen in mesh with a hypothetical reference or basic generating rack. In the initial position of the generating roll motion and the grinding motion, the contact line between the reference or basic generating rack tooth flank and the gear tooth flank is the line Bo and a working area or machining region meridian is the dotted line To. Consequently, the working or machining point is the intersection point S of these two lines. As is depicted in FIGS. 3 and 5, the distance g between the contact line Bo and a contact line B corresponds to the generating path w and is related thereto according to the formula:

$$q = w \cdot \sin \alpha t \quad (2)$$

Consequently, during a generating path w and a grinding stroke h, the working or machining point wanders towards S. The distance ys of point S from an initial position M (chosen as reference point and advantageously as median point of the developed flank plane, i.e. of the generating rack tooth flank) is calculated according to formulas given above. This supplementary feed motion, e.g. of the grinding wheel or disk, can be superimposed on a work or machining point motion which discontinuously or continuously incrementally prescribably displaces the work or machining point relative to its working area or machining region. Therefore, the working or machining point, for example during a given number of grinding wheel revolutions, can be held at a specific distance from the inside or the outside edge of the working or machining surface of the grinding wheel and subsequently brought into an adjacent position for the following revolution group (displacement cycle) until the whole or a prescribable or predeterminate portion of the working area or machining region of the machining tool, i.e. of the grinding wheel, has been swept. Subsequently, a new displacement cycle of the grinding wheel is initiated. With this continuous prescribable or predeterminate displacement of the work or machining point, a spiral track or path is swept or traversed in the working area or machining region during each displacement cycle. Nevertheless, it is not absolutely necessary that this work or machining point displacement be performed in a cyclical manner. It is also possible to jump from one circular track or path to another circular track or path.

The control of working or machining point displacement is performed according to prescribable or predeterminate conditions or values. These values or conditions are stored in any desired form on a data carrier, for example in the form of a curved guide template or as a cam guide disk, in the form of a measuring point or pulse regulation by sensing the machining tool or grinding wheel for signs of wear or its optimization or for better tool exploitation, or in the form of a pulse generator, an electronic data carrying medium, mass memory or the like. Especially the latter, either by themselves or in conjunction with measuring point regulation, can contain empirical values which have been found to produce optimal flank surface properties.

The traversing feed motion is carried out in a manner known per se when grinding gear tooth flanks without topographical or geometric corrections. If the case should arise that a tooth flank is to be ground with a topographical or geometric correction, i.e. with a profile which varies over the width of the tooth, then either the correction motion is superimposed on the feed motion or a correction motion is supplementarily, i.e. entailing more than one step, performed. This is essentially a question of control depending on which value is taken as a reference value, respectively as an initial value, for the feed motion. It is necessary to fully traverse in each correction point from this reference value in a single step or a number of steps. The assignment of the correction values to the individual points of the tooth flank is known per se and is preferably done in a coordinate system of the field of action or machining engagement. Either the workpiece or gear blank or the machining tool or grinding wheel can perform the traversing motion.

Figure 8:
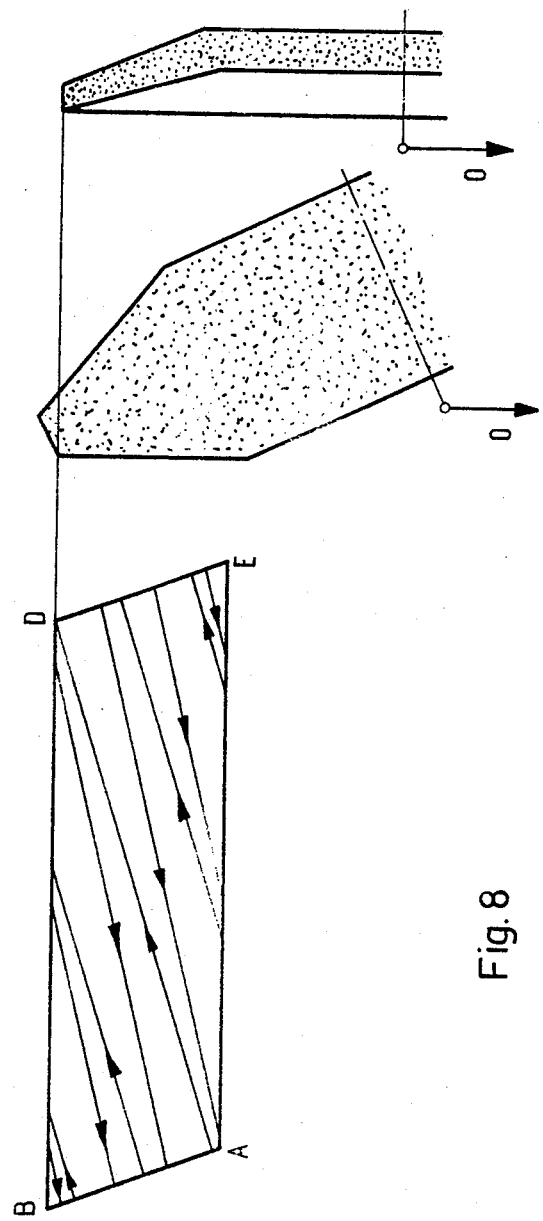
FIG. 8 shows a variation of working or machining lines for processing of tooth flanks extending essentially along generatrices.
Figure 9:
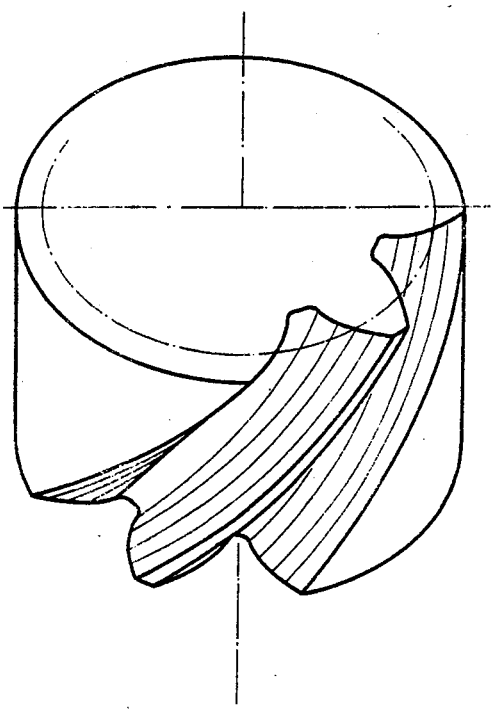
FIG. 9 shows a further variation of working or machining lines extending essentially along helices or spiral lines.

The working or machining line of the embodiment of the method hereinbefore described can take the form of a zig-zag line whose individual segments each extend essentially along a generatrix of the tooth flank (cf. FIG. 8). In practice, however, the actual working or machining line will always deviate somewhat from the theoretical working or machining line. When using this working or machining line either the workpiece or gear blank or, for very large workpieces or gear blanks, the tool or grinding wheel performs a continuous generating feed motion. In addition, the machining tool or tools are moved along the surface of the tooth flank with an oscillating or stroking feed motion. Another form is a meandering or wandering type of work or machining line in which the working or machining point is guided along a generatrix, or at least approximately along a generatrix, as one branch of the segment during a stroke or stroking feed motion. For changing or switching over from one generatrix to a generationally relevant adjacent generatrix, the working or machining point is guided along a profile line, possibly a tooth or flank line as a second branch or segment of the working or machining line. This depends on the position of the turning or reversing point relative to the tooth flank in the course of motion of the grinding process. A discontinuous generating feed motion of the workpiece or gear blank or a corresponding motion of the machining tool or tools results from this configuration of the working or machining line when the machining tool or tools move about the stationary workpiece or gear blank. In this way the machining tool or tools perform the supplementary stroke or stroking feed motion.

In a further embodiment of the method for fabricating involute gear tooth flanks, the workpiece or gear blank is, as usual, clamped to a work or machining table which performs generating feed motions. If the work table, in addition to the continuous generating feed motion, is also rotated and either the work table or the machining tool or tools are moved in accord therewith in the direction of the axis of the gear, then the working or machining point is displaced along a working or machining line in the form of a helical or spiral zig-zag line on the tooth flank (tooth trace or flank line envelope). The generating feed motion, the rotary motion and the axial feed motion are to be carried out such that they are mutually adapted to or match each other so that the working or machining point always lies on the tooth flank. Therefore a helical or spiral motion is superimposed onto a generating motion. The grinding wheel or disk carries out a supplementary feed motion whose direction of motion lies in the working or machining plane or surface of the grinding wheel or disk, i.e. lies in a tangential plane of the tooth flank, so that the selectable working or machining point or its immediate vicinity (the size of which depends on the form of the grinding wheel) is essentially always guided along this working or machining line.

The control of these motions can be the result of a combination of electro-mechanical control utilizing known means, for example for generating the generating feed motion, and of individual motor drive means, in which appropriate position sensors are connected to the regulating and control circuits. It is, however, also possible to control these movements purely electronically with the reference values stored on the most various forms of data storage medium, for example mechanical data storage media such as cam discs or template bars et cetera, magnetic data storage media, optical data storage media et cetera and, by means of the appropriate means for reading-out and transmission and control, to transmit these values to the drive means.

Discontinuous control of the generating feed motion is also possible, although it can only be carried out in steps or increments. The working or machining point is guided along a helical or spiral line of the tooth flank and in the region of the flank end an incremental switch or change movement is undertaken in the form of a generating feed motion which permits the subsequent generatrix envelope to occur. In this way, one generatrix envelope is juxtaposed with another generatrix envelope. The generating feed motion can be performed either by the workpiece or gear blank or by the at least one machining tool or grinding wheel. The working or machining line then has a meandering course or path and its segments consist of two branches: a tooth trace or flank line and a profile line. Consequently, the profile line will, in general, lie on the virtually extended tooth flank, i.e. outside the gear tooth flank. The supplementary generating feed motion of the machining tool must be performed in accordance with the incremental feed motion, i.e. the generating motion, in order that the working point, despite the incrementation, be maintained in the same position relative to the working or machining surface of the machining tool, i.e. the grinding wheel or disk.

If it is required that the working or machining point be continuously or discontinuously displaced within the working area or machining region of the machining tool in order to achieve a uniform wear of the machining tool or to adapt the wear of the machining tool to the economic factors of the machining operation, i.e. to optimize machining tool wear in relation to the machining operation, then a further working or machining point motion is performed. This can be superimposed on the supplementary feed motion or can be undertaken separately from it. The variably selectable working or machining point, also called the operative point, is displaced relative to the machining tool on its working or machining surface, i.e. on the effective cutting area or region of the grinding wheel. This can be achieved continuously according to a spiral line, discontinuously by circular lines or possibly via random number control in order to achieve the most uniform and patternless wear possible of the grinding wheel or disk.

This further embodiment of the inventive method also allows topographical or geometric correction traversing motions to be performed in addition to the normal traversing motion. These correction motions can be controlled in a known manner from the field of action or of machining engagement and can be performed either purely rotationally or translationally by the workpiece or gear blank as well as by the machining tool or grinding wheel.

A further motion can be performed in each of the embodiment of the method, namely the generally non-continuos adjustment of the tool support by a variation amount of the helix angle $\beta$ of helical teeth. This adjustment makes possible, especially when employing dished grinding wheels or disks of conventional construction, a substantial reduction of the circumference of the working or machining point to almost exactly a point. This motion, just as the other motions, can also be performed by a control program. Here, too, the program can be stored on mechanical or magnetic storage media and can be brought into service by means of appropriate data transmission means, for instance mechanical, optical, electrical or magnetic means.

Depending on the working line, a different generatrix envelope network results from each of these embodiments of the method. This generatrix envelope profile network can be optimally configured by means of an appropriate adjustment or matching of the feed and traversing motions with respect to the corresponding variables.

If methods with helical or spiral working lines are employed, or if methods with helical or spiral lines which consist of various component segments are employed, then there results the important advantage that the tool support or head of the machine tool or gear cutting machine is moved not along an inclined straight line but rather along a vertical. Consequently, the machine is not loaded by the displacement of the weight of the tool head, a load which may be quite considerable depending on the operating speed. This contributes substantially to the fabrication accuracy of the workpieces or gears.

It represents an important advantage if the correction traversing motion can be performed by the machining tool, since workpiece or gear blank motion is then saved. In this way the stability of the machine can be substantially increased and vibrations can be avoided.

Depending on the application, in the embodiment of the method with helical or spiral component segments for the machining line, the generatrix envelope can be controllably concentrically or quasi-concentrically altered, on the one hand, and controlled in width, on the other hand. In particular, the generatrix envelope widths in the region of the tooth head or addendum and the tooth root or dedendum can be carried out in different widths.

If only simple dedendum or addendum corrections are to be performed, then they can be generated when employing the tooth trace or flank line envelopes by means of simple relative motions. In principle, the calculation and execution of flank corrections is simpler in this case, since the envelopes of tooth trace or flank lines are limited. For example, the same values are used during a complete grinding stroke in normal profile corrections. With the choice of appropriate values for the correction parameters, profile corrections can also be generated by tangential motions. It is also basically possible to make use of corrected tools, for example grinding wheels or disks or milling face or side cutters. Slot milling cutters or end mills or the like can also be used. Analogously, the same values are always set for each envelope when performing longitudinal corrections.

In each of the described exemplarily embodiments of the inventive method, that is with a generatrix machining line and with helical or spiral component segments in the working or machining line, it is advantageous that topographical or geometric corrections can be performed much more accurately than heretofore, since they are generated using practically a single working or machining point and the desired correction values are freely prescribable. Furthermore, grinding wheels with flat or conical working or machining surfaces can be used. These working or machining surfaces are easily produced and maintained.

The choice between both variations of the method will be made according to the individual application. If, for example, it is required that only very small or almost no profile differences should occur between the tooth ends and the tooth center and it is necessary to work with a continuous generating feed motion, then the method described as the second examplary embodiment and having helical or spiral lines as segments or components of the working or machining line will be particularly advantageous.

Neither of the two embodiments of the method require tools which are specific to the workpiece or gear blank and none of them require tool correction devices with the associated maintenance and inspection work.

Figure 13:
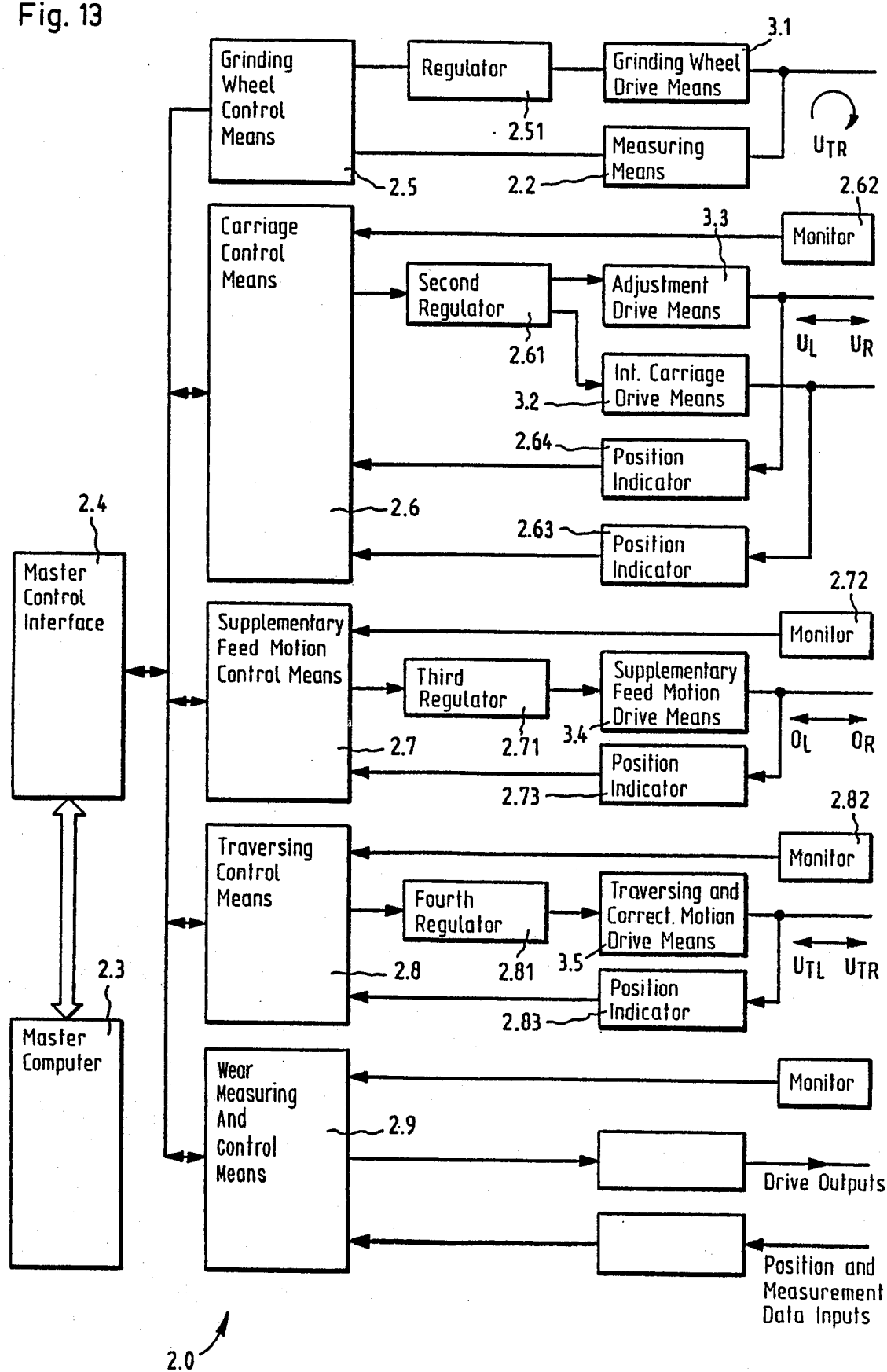
FIG. 13 shows a schematic diagram of a control device or means for an exemplary embodiment of a machine tool or gear generating machine.
Figure 14:
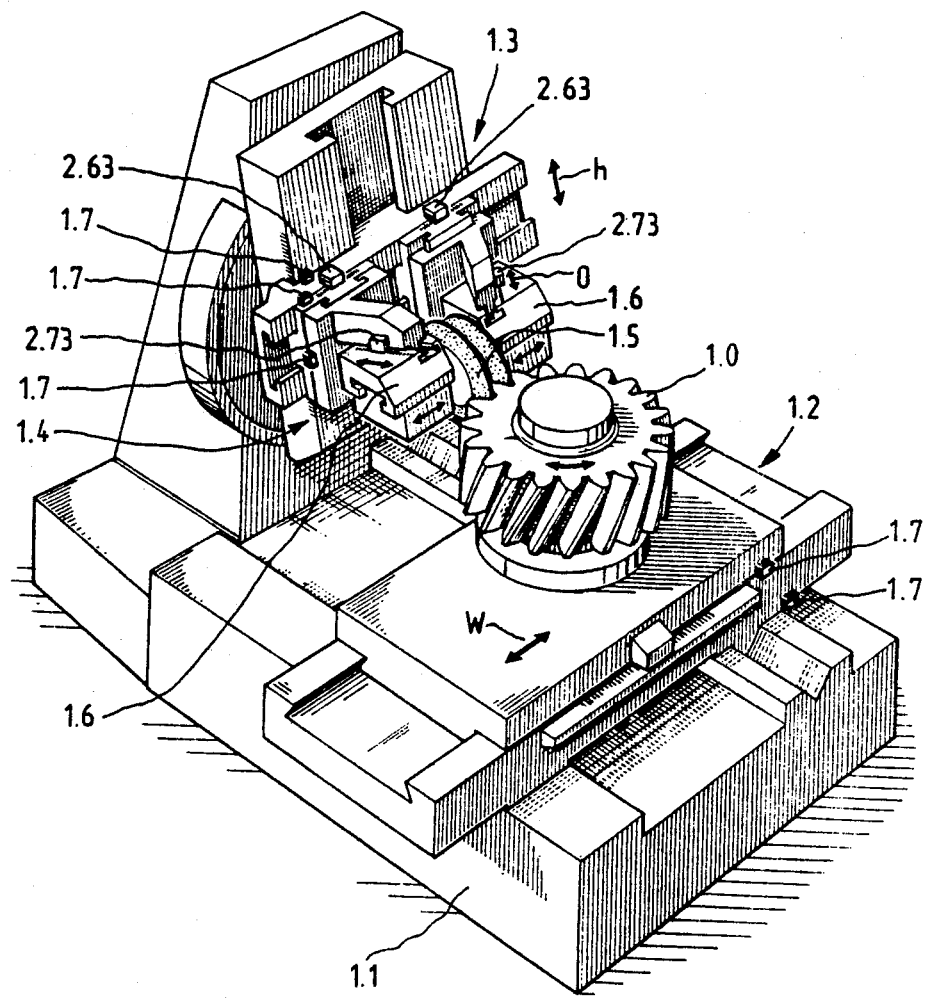
FIG. 14 shows a schematic depiction of an exemplary embodiment of a machining tool or gear generating machine employing a working or machining line having generatrix linear segments.

FIG. 14 depicts an exemplary embodiment of a machine tool or gear cutting machine for performing the method of the invention for fabricating a gear wheel 1.0 using generatrices as the working or machining line. There is provided, as usual, a machine frame 1.1 which on one side carries a displaceable or translatable generating motion carriage or slide 1.2 and on the other side a cross or transverse slide or carriage or multi-carriage arrangement 1.3 of a type known per se and which is swivellably mounted for adjusting the tooth helix angle. A tool support 1.4, on which a machining tool or tools, for example grinding wheels or disks 1.5, are seated or fastened, is fixed to the cross or transverse slide or carriage arrangement 1.3. A correspondingly adjustable feed slide or carriage 1.6 is provided for carrying out the supplementary feed motion with which the working or machining point of each of the grinding wheels or disks 1.5 is guided tangentially to the gear tooth flank to be fabricated. Preferably, motion or displacement transducers or other position indicators or sensors 1.7 are provided on all of the slides or carriages. These position indicators or sensors 1.7 are connected with a control arrangement 2.0 (shown in FIG. 13). This control arrangement 2.0 can be either purely electronic or a mechanically and electronically operated control means. For example, the generating motion can be derived in conventional manner from a generating tape control means. The drive motors also possess rotary speed transducers 2.2 (FIG. 13) which are connected with the control arrangement 2.0. For the sake of expository simplicity, it will be assumed that the machine tool shown in FIG. 14 contains an electromechanical control means in which the generating tape control means is of a type known per se and therefore not shown in FIG. 14 and also not described in detail here.

Such a control means (cf. FIG. 13) possesses a master computer or control processor 2.3 which contains and runs the basic control program. It is connected with a master control interface 2.4 for controlling and monitoring each tool support 1.4 as well as the other not particularly mentioned motions such as, for instance, the stroke or stroking feed motions, the adjustment motion of the tooth helix angle and its deviations from the reference value, positional motion of the workpiece or gear blank as well as other necessary and known movements. This master control interface 2.4 is connected to each of the following control and monitoring devices:

a grinding wheel control means 2.5 for the grinding wheel or disk;

a carriage control means 2.6 for controlling pressure angle, tooth helix angle and intermediate slide motion;

a supplementary feed control means 2.7 for the supplementary feed motion;

a traversing control means 2.8 for the traversing motion as well as the normal cutting or grinding, i.e. machining motion and also the normal and topographical or geometric correction motions; and a wear control means 2.9 for the grinding wheel measuring device for measuring grinding wheel wear and for performing diameter compensation et cetera.

A regulator 2.51 is connected to the grinding wheel control means 2.5 and also to a grinding wheel drive means 3.1. A rotary speed transducer or measuring means or system or tachometer 2.2 is connected to the grinding wheel drive means 3.1 and is also connected to the grinding wheel control means 2.5. This feedback regulation circuit serves for accurate revolution or speed regulation in cooperation with the other controlled motions and machine functions.

Figure 12:
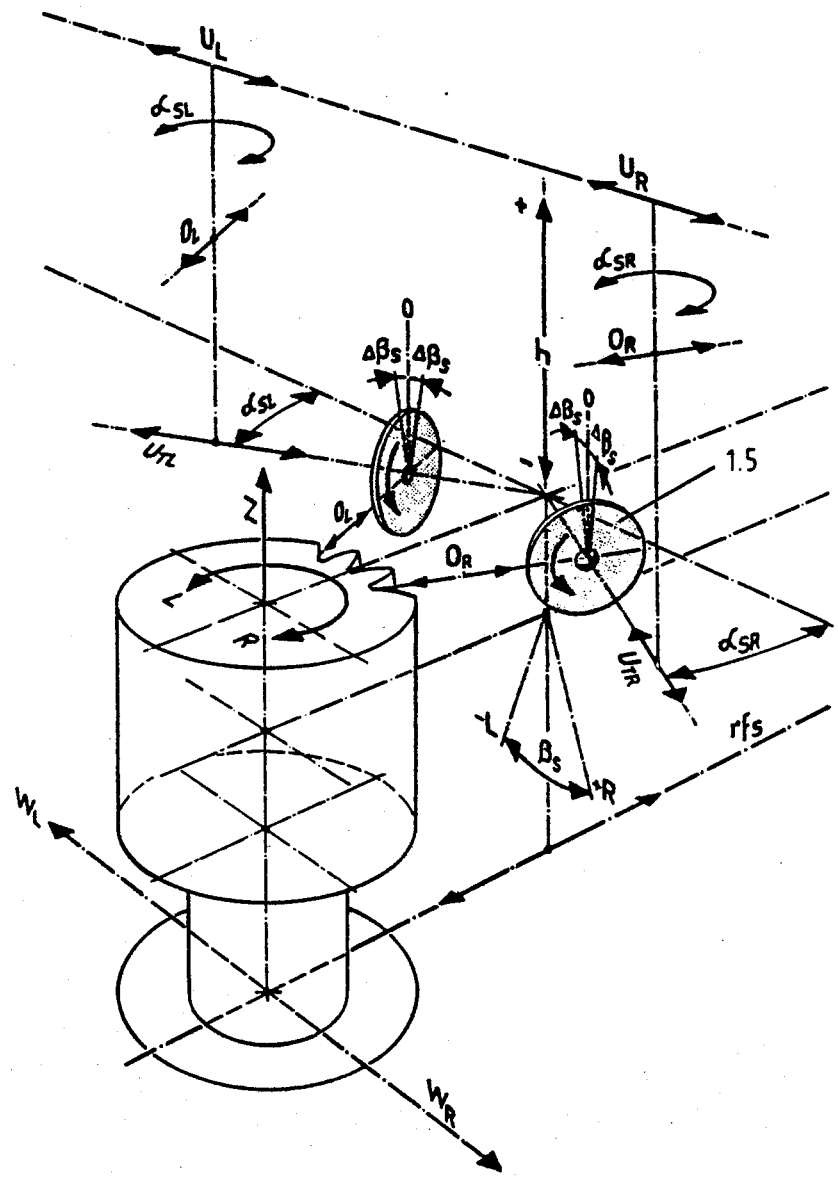
FIG. 12 shows a depiction of the important motion axes of the inventive method when using a work or machining line comprising generatrix segments wherein, for the sake of representational clarity, the relationships for fabrication of straight toothing are shown.

The carriage control means 2.6 for intermediate slide or carriage motion, pressure angle and helix angle is connected to a monitoring arrangement 2.62 for position feedback and a second regulator 2.61 which is connected on one side to an intermediate slide or carriage drive means 3.2 for positioning each of a first or right hand control axis $U_R$ and a second or left hand control axis $U_L$ of the machine tool or gear cutting machine illustrated in FIG. 12 and on the other side with a drive means 3.3 for adjusting the pressure angle $\alpha$ or the tooth helix angle $\lambda$ or both. The intermediate slide or carriage drive means 3.2 is connected to a position indicator or sensor 2.63 which in turn is connected with the carriage control means 2.6 for controlling pressure angle, helix angle and intermediate slide or carriage motion. The drive means 3.3 for adjusting the pressure angle $\alpha$ or the tooth helix angle $\beta$ or both is also connected to a position indicator or measuring system 2.64 (which is not shown in FIG. 8 due to the conical grinding wheels employed), whose measuring data is transmitted to the carriage control means 2.6 for controlling pressure angle, helix angle and intermediate slide or carriage motion. The reference data for each position are transmitted to this carriage control means 2.6 by the master control interface 2.4 and the carriage control means 2.6 returns its own data back to the master control interface 2.4.

The supplementary feed control means 2.7 for the supplementary feed motion is also connected through its input and output means to the master control interface 2.4 and is connected through an input means to a monitoring interface 2.72 for monitoring the positions of the controlled components. The supplementary feed control means 2.7 is also connected to a third regulator 2.71 which controls the drive means 3.4 for the supplementary feed motion. A position measuring system or indicator 2.73 is connected to this drive means 3.4. The position measuring system 2.73 feeds its measuring data for the supplementary feed motion to the supplementary feed control means 2.7.

A monitoring means 2.82 for the end or reversing positions and the working or machining positions of the guide means is connected to the traversing control means 2.8 for the normal and the topographical or geometric corrections of the tooth flanks. A fourth regulator 2.81 for the drive means 3.5 of the traversing and correction motions of the machining tool or each machining tool 1.5 is connected to the traversing control means 2.8. This drive means 3.5 can also cooperate with a machine axis which is associated with a workpiece or gear blank so that the traversing motion is performed by the workpiece or gear blank 1.0. A position measuring system or indicator 2.83 is connected to this drive means 3.5 and transmits its signals to the traversing control means 2.8 for the traversing and correction motions.

The measuring control or wear measuring and control means 2.9 is for controlling, monitoring and processing measurement data and is connected to measurement and position indicator means as well as monitoring means and drive output means. It communicates with the master computer or control processor 2.3 through the master control interface 2.4.

All these control means 2.5 to 2.9 communicate with the master control interface 2.4 and the master control interface 2.4 exchanges signals or data with the master computer or control processor 2.3 so that all motions are interrelated and controlled in accordance with the regulating and measuring data.

In FIG. 12 only the most important machine axes to be controlled are shown. These are:

$W_L$, $W_R$ = two, i.e. left and right hand, branches or segments of the generating motion;

rfs = positional axis between machining tool or tools and workpiece or gear blank;

$U_{TL}$, $U_{TR}$ = left and right hand traversing axes for machining traverse and correction traverse;

$O_L$, $O_R$ = left and right hand axes of the supplementary feed motions;

$\alpha_{SL}$, $\alpha_{SR}$ = left and right hand pressure angle adjustment axes;

$U_L$, $U_R$ = left and right hand intermediate slide or carriage axes;

$\beta s$, $\Delta\beta s$ = tooth helix angle and its variations;

h = machining tool or grinding wheel stroke.

Figure 10:
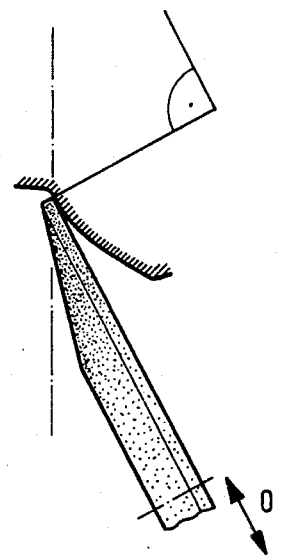
FIGS. 10a, 10b and 10c show various grinding wheels suitable for the inventive method.
Figure 10:
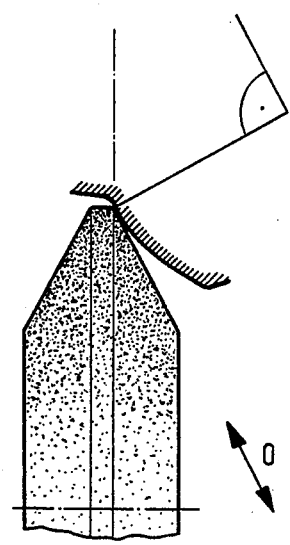
Figure 10:
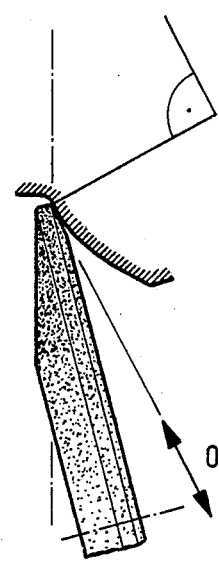
Figure 11:
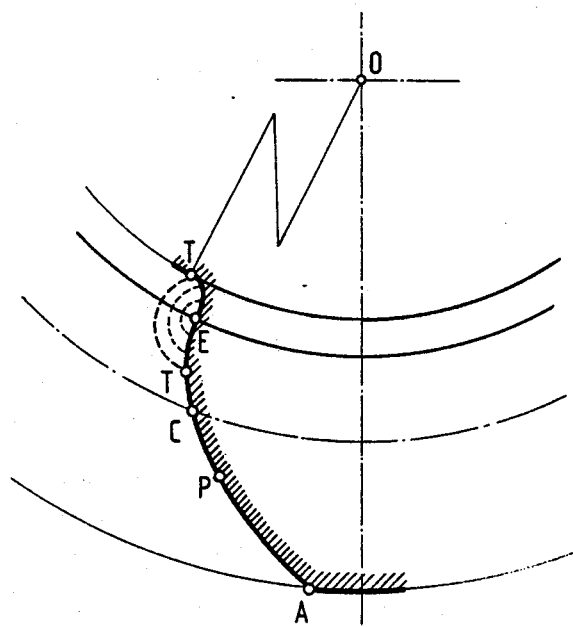
FIG. 11 shows simultaneously generated points of the second or inner dedendum portion of the tooth flank involute and the root fillet radius or undercut.

Grinding wheels or disks are preferably utilized as the machining or grinding tools 1.5. These can have the well-known basic form which is substantially that of a dish or disk or that of a double cone, as is shown in FIGS. 10a and 10b. In consequence of the supplementary feed motion utilized according to the method of the invention, the working areas or machining regions of the grinding wheel or disk can be kept substantially narrower than in heretofore known grinding methods. A particularly advantageous form of grinding wheel or disk is shown in FIG. 10c. This type of grinding wheel is a modified dished wheel or disk and possesses instead of a planar working or machining surface a conical frustum having an included or cone angle slightly less than 180°. This form of grinding wheel or disk unites the advantages of the dished wheel with those of the conical wheel.

Figure 15A:
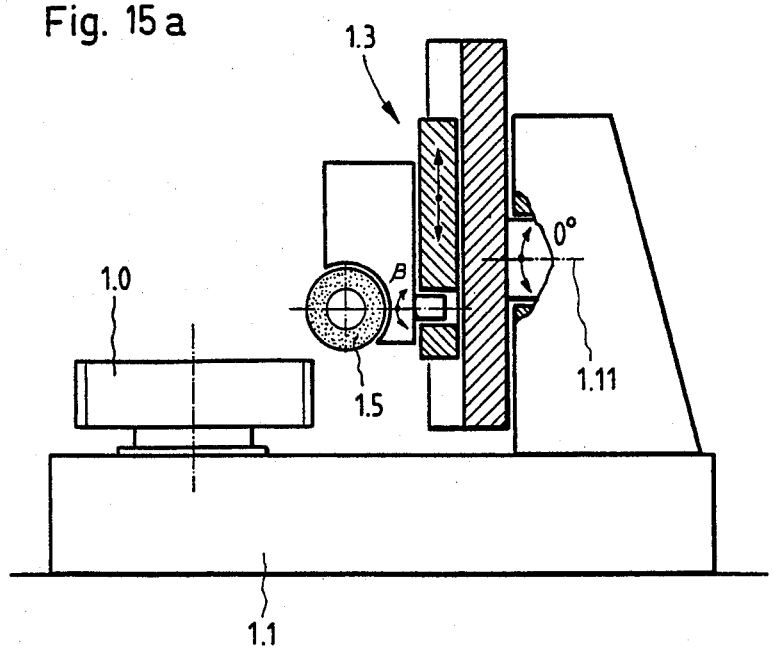
FIGS. 15a and 15b show the schematic depiction of a further exemplary embodiment of a machining tool or gear generating machine employing helical or spiral working or machining lines.
Figure 15B:
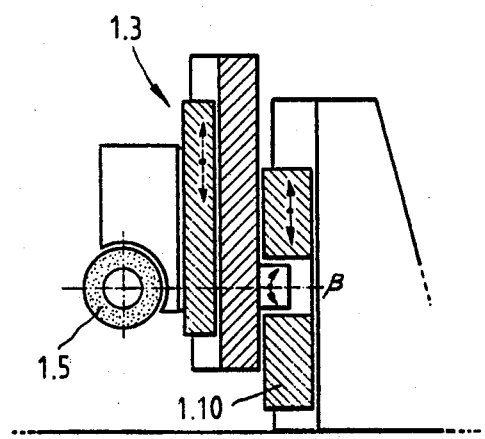
Figure 16:
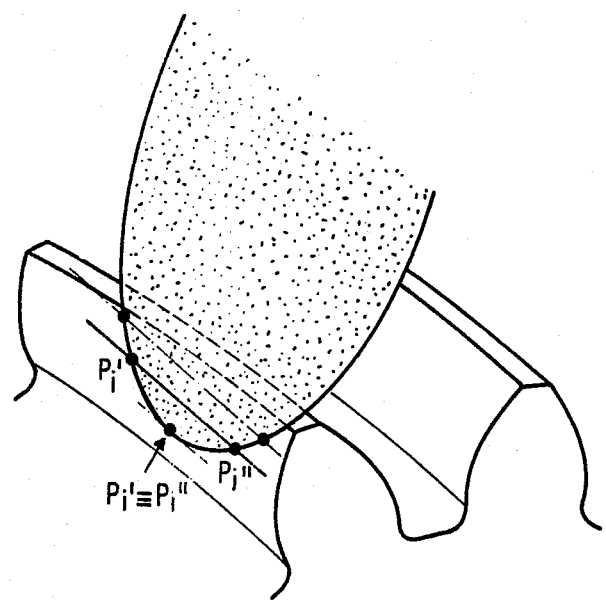
FIG. 16 shows the two working or machining points of prior art methods when employing a generatrix working or machining line and using a dished grinding wheel.

An exemplary apparatus for carrying out the grinding method of the invention employing a working or machining line with helical or spiral component segments can be very similar to the apparatus hereinbefore described. This apparatus also comprises a machine frame 1.1 which on one side carries a displaceable generating carriage or slide arrangement and on the other side a pivotably mounted cross or transverse slide or carriage arrangement 1.3 known per se for adjusting the helix angle. However, for the helical or spiral working or machining line, at least one component or portion of the slide or carriage complex must be guidable parallel to the axis of the machining tool in a stroke feed motion. For this purpose, a further slide 1.10 in accordance with FIG. 15b or an addition swivel axis 1.11 in accordance with FIG. 15a must be provided between the machine frame 1.1 and one slide or carriage. Alternatively, the motions are so controlled that the resultant motion is identical with this stroke feed motion. The difference lies essentially in the temporal control of the individual motions for achieving the tooth flank form.

The control of these motions can be most readily realized by means of an arrangement of individual drives or drive means for each motion. The tooth helix is in this case achieved not through a stroke motion of a stroke slide or carriage or a corresponding slide or carriage arrangement performed at an inclination towards the gear axis, but by means of a slide or carriage which is displaceable parallel to the gear axis.

In order to employ the helix or spiral as a component segment of the working or machining line, the workpiece is rotated on the workpiece carrier or support. Only at the end of the tooth trace or flank line is the incrementation performed for generating the next envelope of the workpiece or ear blank by means of the generating drive means utilizing either an electronically controlled drive means or a conventional generating tape control means.

For carrying out the normal or the topographical or geometric corrections, control means are provided which cooperate with the drive means for the individual motion axes. The operating sequence of the motions is determined by mechanical, magnetic, optical or electrical storage media. The motions can be carried out such that the correction traverses of the machining tool are purely rotary, purely translatory or a combination of the two. To achieve this, the drive mean are activated so that the desired resultant motions arise. The supplementary rotation or angular displacement of the gear or rotary table, i.e. the work or machining table, amounts to:

$$nt = Fk/db \qquad (3)$$

wherein:
Fk = Flank correction value
db = Base circle diameter
nt = Supplementary motion of the gear or rotary table The control means for generatrix envelope optimization is also similarly stored on storage media as a sequence of signal sequences cooperating with position indicators and can be fed into the control means for the individual motion sequences. The required freedom of play in the drive can only be achieved with great difficulty or with great design outlay when employing prior art drives. For instance, a double-worm drive would be necessary for the gear or rotary table. With the inventive individual drive arrangement controlled by command sequences, this play can be achieved very easily.

While there are shown and described present preferred embodiments of the invention, it is to be distinctly understood that the invention is not limited thereto, but may be otherwise variously embodied and practiced within the scope of the following claims.

Accordingly, what I claim is:

1. An apparatus for fabricating involute gear tooth flanks both with and without geometric correction in a gear blank, comprising:

a machine frame;

a generating carriage translatably arranged upon said machine frame;

said generating carriage being provided with a gear blank holder and clamping means for holding said gear blank;

means controlling said generating carriage such that said generating carriage carrying said gear blank is subject to a generating feed motion in accordance with a gear tooth flange generatrix envelope associated with a predetermined involute gear tooth flank;

a multiple-carriage arrangement carrying at least one machining tool;

said multiple-carriage arrangement being arranged relative to said generating carriage for performing a machining operation by said at least one machining tool on said gear blank held at said generating carriage;

drive means drivingly connected to said multiple-carriage arrangement;

control means controlling said drive means drivingly connected to said multiple-carriage arrangement such that said at least one machining tool, during said machining operation, is subject to a feed motion substantially along a gear tooth flank generatrix of said gear tooth flank generatrix envelope associated with said predetermined involute gear tooth flank and a traversing motion determining the depth of the machining operation during said generating feed motion of said generating carriage;

means selectively controlling either said generating carriage or said multiple-carriage arrangement in order to produce a generating roll motion of either said generating carriage or said multiple-carriage arrangement;

each said at least one machining tool having a selectable single machining point thereupon;

supplementary control means selectively controlling either said generating carriage or said multiple-carriage arrangement for generating a supplementary feed motion;

said at least one machining tool, during said machining operation and said supplementary feed motion, substantially tangentially contacting said gear blank at least in the immediate vicinity of said at least one selectable single machining point and along a selectably predeterminate machining line extending at least approximately along said gear tooth flank generatrix; and position indicator means connected to said supplementary control means for selectively indicating the position of either said generating carriage or said multiple-carriage arrangement.

2. The apparatus as defined in claim 1, wherein:
said multiple-carriage arrangement contains at least one carriage carrying said at least one machining tool; and guide means for guiding said at least one carriage through said supplementary feed motion of said at least one machining tool under the control of said supplementary control means.

3. The apparatus as defined in claim 1 wherein:

said means controlling said generating carriage for producing said generating feed motion comprise mechanical control means; and said control means controlling said drive means drivingly connected to said multiple-carriage arrangement and said supplementary control means for generating said supplementary feed motion comprising electronic control circuitry.

4. The apparatus as defined in claim 3, further including:

a master computer;

a master control interface;

said master control interface interconnecting said electronic control circuitry and said master computer for mutually exchanging signals therewith;

at least one grinding wheel constituting said at least one machining tool;

grinding wheel drive means drivingly connected to said at least one grinding wheel;

said electronic control circuitry containing grinding wheel control means for controlling said at least one grinding wheel drive means;

said drive means driving connected to said multiple-carriage arrangement including adjustment drive means for adjusting said at least one grinding wheel with respect to a predetermined pressure angle and a predetermined helix angle relative to said gear blank held on said generating carriage;

said multiple-carriage containing at least one intermediate carriage;

said drive means drivingly connected to aid multiple-carriage arrangement still further including drive means drivingly connected to said at least one intermediate carriage for positioning said at least one intermediate carriage with respect to two predetermined control axes;

said electronic control circuitry selectively controlling each one of aid adjustment drive means and said drive means drivingly connected to said at least one intermediate carriage;

said electronic control circuitry further containing traversing control means for selectively controlling each one of a desired one of (i) said traversing motion of said at least one grinding wheel, (ii) normal correction traversing motions, (iii) geometric correction traversing motions or (iv) both normal and geometric correction traversing motions;

a wear measuring device for measuring wear of said at least one grinding wheel; and wear measuring and control means of said electronic control circuitry connected with said wear measuring device and for wear compensation at said at least one grinding wheel.

5. The apparatus as defined in claim 1, wherein:

said control means for controlling all motions comprise electronic circuitry.

6. The apparatus as defined in claim 1, wherein:

said at least one machining tool comprises a dished grinding wheel known.

7. The apparatus as defined in claim 1, wherein:

said at least one machining tool comprises a conical grinding wheel known.

8. The apparatus as defined in claim 1, wherein:

said at least one machining tool comprises a dished grinding wheel;

said dished grinding wheel having a machining surface;

said machining surface comprising a conical frustrum; and said conical frustrum having an included cone angle of slightly less than 180°.

9. The apparatus as defined in claim 1, wherein:

said at least one machining tool possesses at least one predetermined machining surface; and said at least one selectable single machining point being located on said at least one predetermined machining surface of said at least one machining tool.

* * * * *